United States Patent
Coleman

(10) Patent No.: US 9,577,519 B2
(45) Date of Patent: Feb. 21, 2017

(54) ENHANCED PEAK CURRENT MODE DC-DC POWER CONVERTER

(71) Applicant: Fairchild Semiconductor Corporation, San Jose, CA (US)

(72) Inventor: Edward P. Coleman, Salt Springs, FL (US)

(73) Assignee: Fairchild Semiconductor Corporation, Sunnyvale, CA (US)

( * ) Notice: Subject to any disclaimer, the term of this patent is extended or adjusted under 35 U.S.C. 154(b) by 62 days.

(21) Appl. No.: 14/611,459

(22) Filed: Feb. 2, 2015

(65) Prior Publication Data

US 2015/0222181 A1 Aug. 6, 2015

Related U.S. Application Data

(60) Provisional application No. 61/935,888, filed on Feb. 5, 2014.

(51) Int. Cl.
*H02M 3/156* (2006.01)
*H02M 3/157* (2006.01)
*H02M 3/158* (2006.01)
*H02M 1/00* (2006.01)

(52) U.S. Cl.
CPC ............. *H02M 3/156* (2013.01); *H02M 3/157* (2013.01); *H02M 3/158* (2013.01); *H02M 2001/0025* (2013.01); *H02M 2003/1566* (2013.01)

(58) Field of Classification Search
CPC ...................................................... H02M 3/156
USPC ......................................................... 323/288
See application file for complete search history.

(56) References Cited

U.S. PATENT DOCUMENTS

| | | | | |
|---|---|---|---|---|
| 5,341,032 A * | 8/1994 | Brambilla | ............... | F02D 41/20 123/490 |
| 2007/0236188 A1* | 10/2007 | Gibson | ............... | H02M 3/1563 323/225 |
| 2012/0026765 A1* | 2/2012 | Adragna | ............. | H02M 1/4225 363/78 |
| 2012/0176818 A1* | 7/2012 | Gati | .................. | H02M 3/33523 363/21.07 |

(Continued)

OTHER PUBLICATIONS

Dennis Solley, AND8276/D Theory of Operation of V2 Controllers with Emphasis on Applications using MLCC's for Output Filtering, on Semiconductor, May 2009, 8 pages, Rev. 0.

*Primary Examiner* — Jue Zhang
*Assistant Examiner* — Trinh Dang
(74) *Attorney, Agent, or Firm* — Grossman Tucker Perreault & Pfleger PLLC

(57) ABSTRACT

Apparatus and methods are provided for feedback circuitry in a power converter, the feedback circuitry including a first resistor coupled to a first node between a high switch and a low switch, a first capacitor in series with the first resistor, the first capacitor coupled to a second node, a first comparator having a positive terminal connected between the first resistor and the first capacitor and a negative terminal connected to a third node, the first comparator configured to compare a voltage at the positive terminal to a voltage at the negative terminal, wherein the feedback circuitry is configured to generate a ramp waveform at the positive terminal of the first comparator, an amplitude of the ramp waveform based on a time constant of the first resistor and the first capacitor.

12 Claims, 5 Drawing Sheets

(56) References Cited

U.S. PATENT DOCUMENTS

2014/0292299 A1\* 10/2014 Yang .................. H02M 3/1588
                                                    323/288

\* cited by examiner

ENHANCED PEAK CURRENT MODE DC-DC POWER CONVERTER

PRIORITY

The present U.S. Non-provisional patent application claims the benefit of U.S. Provisional Patent Application No. 61/935,888 entitled "Enhanced Peak Current Mode DC-DC Power Converter" with a filing date of Feb. 5, 2014. The contents of the above-identified U.S. Provisional patent application are incorporated by reference herein.

FIELD

The present disclosure relates to DC-DC power converters, and more particularly, to enhanced peak current mode DC-DC power converters.

BACKGROUND

DC-DC power converters can be used to convert a first voltage to a second voltage that may be higher or lower than the first voltage. Typically, a duty cycle of the output stage of the power converter is controlled by control logic in order to properly regulate the output voltage. However, power converters may have a slow load transient response due to delays in the control logic caused by a feedback path from the power converter output. For example, the control logic may include a compensation network and an error amplifier to sample the output voltage, which adds delays to the load transient response.

BRIEF DESCRIPTION OF THE DRAWINGS

Features and advantages of the claimed subject matter will be apparent from the following detailed description of some example embodiments consistent therewith, which description should be considered with reference to the accompanying drawings, wherein:

Although the following Detailed Description will proceed with reference being made to some illustrative example embodiments, many alternatives, modifications, and variations thereof will be apparent to those skilled in the art.

DETAILED DESCRIPTION

Generally, the present disclosure provides devices and/or methods for converting and regulating an output voltage with a reduced feedback delay time. Some example embodiments have a fast feedback path from an output voltage to a comparator via a ramp capacitor, which avoids the need for components such as an error amplifier that may add a delay.

Figure 1:
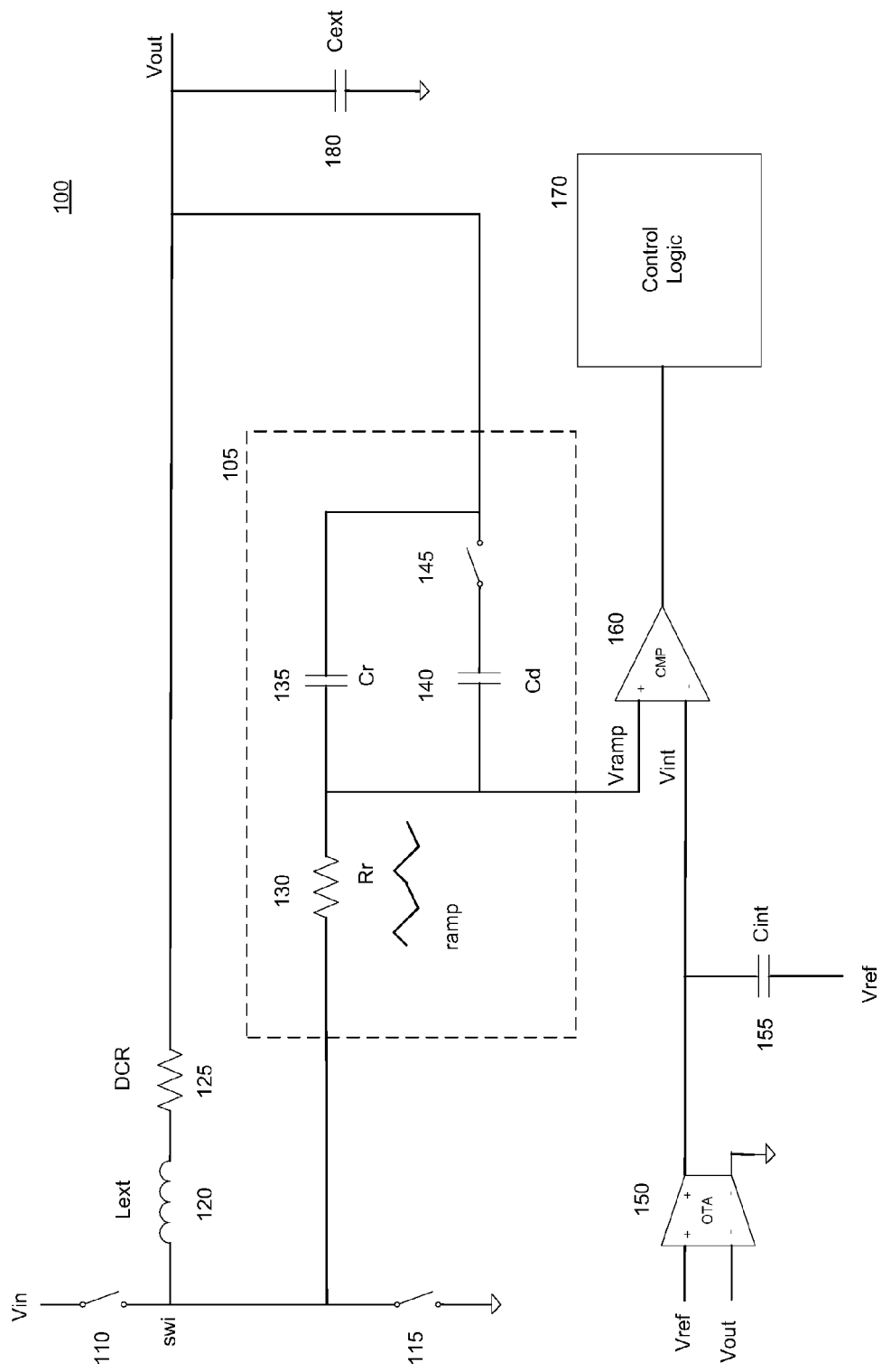
FIG. 1 illustrates a buck converter including ramp circuitry according to some example embodiments.

FIG. 1 illustrates a buck converter 100 including ramp circuitry 105 according to some example embodiments. The ramp circuitry 105 may include a ramp resistor 130 and a ramp capacitor 135 in series. The ramp circuitry 105 may also include a damping capacitor 140 and a damping switch 145 in series, which combined are in parallel to the ramp capacitor 135. The ramp resistor 130 and the ramp capacitor 135 may generate a ramp waveform, an amplitude of the ramp waveform based on the RC time constant of the ramp circuitry 105. In addition, the damping switch 145 may turn on or conduct at the beginning of each control cycle so that the ramp circuitry 105 may take into account a prior cycle.

The buck converter 100 is configured to receive an input voltage Vin and generate an output voltage Vout that is lower than the input voltage Vin. For example, the buck converter 100 may control a high switch 110 and a low switch 115 to alternate between two different states. The first state occurs when the high switch 110 is conducting and the low switch 115 is not conducting, so that the output voltage Vout is coupled to the input voltage Vin through an inductor 120, which includes a DC resistance (DCR) 125. The second state occurs when the high switch 110 is not conducting and the low switch 115 is conducting, so that the output voltage Vout is coupled to a low reference potential (e.g., ground) through the inductor 120 and the DCR 125. A percent of time spent in the first state compared to the total time spent in the first state and the second state is considered the duty cycle of the buck converter 100. Decreasing the duty cycle decreases the output voltage Vout and increasing the duty cycle increases the output voltage Vout.

When the buck converter 100 is in the first state, the input voltage Vin may increase energy stored in the inductor 120. For example, the inductor 120 may have a positive voltage from the perspective of the high switch 110, such that the inductor voltage is a positive difference between the input voltage Vin and the output voltage Vout. When the buck converter 100 is in the second state, the inductor 120 may discharge at least some of the stored energy and have a negative voltage from the perspective of the high switch 110, such that the inductor voltage is a negative difference between the low reference potential (e.g. ground) and the output voltage Vout. An external capacitor 180 coupled to the output voltage Vout may also store energy in the first state and discharge the stored energy in the second state.

To regulate the output voltage Vout, the buck converter 100 may use an operational transconductance amplifier (OTA) 150, an integrator capacitor 155, a comparator 160 and control logic 170 to control the duty cycle of the buck converter 100. For example, the comparator 160 may compare a ramp voltage Vramp from the ramp circuitry 105 to an integrator voltage Vint. If the integrator voltage Vint is higher than the ramp voltage Vramp, the comparator 160 may output a logic low signal to the control logic 170 and the control logic 170 may control the buck converter 100 to be in the first state. If the ramp voltage Vramp is higher than the integrator voltage Vint, the comparator 160 may output a logic high signal to the control logic 170 and the control logic 170 may control the buck converter 100 to be in the second state. Thus, by comparing the ramp voltage Vramp to the integrator voltage Vint, the comparator 160 and the control logic 170 may control the duty cycle of the buck converter 100. This duty cycle can be expressed as a variable between 0 and 1, with a 0 indicating that the output voltage Vout is coupled to the low reference potential for the entire period and a 1 indicating that the output voltage Vout is coupled to the input voltage Vin for the entire period. The comparator 160 and the control logic 170 may be collectively referred to as a pulse wide modulated (PWM) stage of the buck converter 100.

The ramp voltage Vramp may include the output voltage Vout and the ramp waveform generated by the ramp circuitry 105. The ramp waveform may be generated by filtering the free-wheeling side (SWI) of the inductor 120 using the ramp resistor 130 and the ramp capacitor 135. As discussed above, the amplitude of the ramp waveform may be based on the RC time constant of the ramp resistor 130 and the ramp capacitor 135.

A slope of the ramp waveform and a current through the inductor 120 may be dependent on a voltage across the inductor 120. The slope may alter the PWM gain and frequency response due to pole splitting via the ramp capacitor 135 feedback path from the output voltage to the input of the PWM stage. If the output voltage Vout is lower than the input voltage Vin, which is common in most buck converters, the slope may be calculated as the input voltage Vin minus the output voltage Vout, over the inductance of the inductor 120 [(Vin−Vout)/L].

As discussed above, the inductor 120 may have a positive voltage (Vin−Vout) in the first state of the buck converter 100 and a negative voltage (−Vout) in the second state of the buck converter 100, and the voltage across the inductor 120 may switch instantaneously. Thus, the slope may be positive when the buck converter 100 is in the first state and negative when the buck converter 100 is in the second state. However, when the voltage across the inductor 120 reverses, the current through the inductor 120 remains the same. Therefore, a transition from the second state to the first state is a local minimum in the inductor current and the positive slope during the first state of the buck converter 100 increases the inductor current to a local maximum prior to transitioning to the second state, where the negative slope during the second state of the buck converter 100 decreases the inductor current to another local minimum. Similarly, a transition from the second state to the first state is a local minimum in a voltage across the ramp capacitor 135 and the positive slope during the first state of the buck converter 100 increases the voltage across the ramp capacitor 135 to a local maximum prior to transitioning to the second state, where the negative slope during the second state of the buck converter 100 decreases the voltage across the ramp capacitor 135 to another local minimum. This alternating positive and negative slope creates the ramp waveform, with the amplitude being the difference between the local maximum and the local minimum.

A shape of the ramp waveform may be dependent on the duty cycle of the buck converter 100, which may be based on a ratio of the output voltage Vout to the input voltage Vin. Without accounting for voltage drops across switches or transistors, the duty cycle of a buck converter in continuous mode is generally equal to the output voltage Vout over the input voltage Vin [D=Vout/Vin]. For example, if the output voltage Vout is roughly two thirds the input voltage Vin, the duty cycle will be roughly ⅔. As a result, the inductor 120 will have a positive voltage of ⅓ the input voltage Vin in the first state and a negative voltage of ⅔ the input voltage Vin in the second state. Thus, the negative slope of the inductor current in the second state will be twice the positive slope of the inductor current in the first state, creating an asymmetric triangle wave.

The integrator voltage Vint may include a reference voltage Vref and a voltage across the integrator capacitor 155. The voltage across the integrator capacitor 155 may be based on the output of the OTA 150, which generates a current based on a comparison between the reference voltage Vref and the output voltage Vout. For example, the OTA 150 may generate a current as a linear function of the differential input voltage to the OTA 150, such that the current is equal to (Vref−Vout)*$g_m$. The coefficient $g_m$ may vary, but an example of a possible value is 5 µA/V. Therefore, if the output voltage Vout is below the reference voltage Vref, a positive current may be output to the integrator capacitor 155. If the output voltage Vout is above the reference voltage Vref, a negative current may be output to the integrator capacitor 155.

Therefore, when the comparator 160 is comparing the ramp voltage Vramp to the integrator voltage Vint, the comparator 160 may be effectively comparing the output voltage Vout and the ramp waveform to the reference voltage Vref and the voltage across the integrator capacitor 155. If the output voltage Vout and the ramp waveform is less than the reference voltage Vref and the voltage across the integrator capacitor 155, the comparator 160 may output a logic low signal to the control logic 170 and the control logic 170 may control the buck converter 100 to be in the first state. If the output voltage Vout and the ramp waveform is greater than the reference voltage Vref and the voltage across the integrator capacitor 155, the comparator 160 may output a logic high signal to the control logic 170 and the control logic 170 may control the buck converter 100 to be in the second state. Therefore, the transition where the output voltage Vout and the ramp waveform are equal to the reference voltage Vref and the voltage across the integrator capacitor 155 determines the duty cycle.

As the reference voltage and the ramp waveform are intended to remain constant and consistent, respectively, and the duty cycle is determined by an intersection point of the output voltage Vout and the ramp waveform with the reference voltage Vref and the voltage across the integrator capacitor 155, the duty cycle is effectively controlled by the output voltage Vout and the voltage across the integrator capacitor 155. For example, if the output voltage Vout is less than the reference voltage Vref, the OTA 150 may increase the voltage across the integrator capacitor 155 to increase the intersection point and therefore increase the duty cycle. This increased voltage across the integrator capacitor 155 remains until the output voltage Vout is greater than the reference voltage Vref, at which point the OTA 150 may decrease the voltage across the integrator capacitor 155 to decrease the intersection point and therefore decrease the duty cycle.

The ramp circuitry 105 may allow fast load transient response between the buck converter 100 output and the PWM stage. As a result, a derivative of the output voltage Vout may experience only a high speed comparator delay. Moreover, voltage regulation may be performed without requiring an error amplifier or a compensation network, which further enhances load transient response.

A voltage across the DCR 125 may provide a load current dependent envelope term (Iout*DCR, where Iout is the output current), which provides feedback for intrinsic mode control. However, the load current envelope term may also be filtered by the ramp circuitry 105, which makes it more difficult to balance setting the desired ramp amplitude without adding too much phase delay on the envelope term.

The damping capacitor 140 may add slope correction to the ramp circuitry 105. As the damping switch 145 is turned on once a control cycle prior to the charging cycle, the damping capacitor 140 may be sampled each control cycle to provide a voltage from the prior cycle. This may oppose duty cycle reverses and damp sub-harmonic oscillations. For example, prior to the start of each charge cycle, the damping capacitor 140 may be momentarily shorted across the ramp capacitor 135. When the buck converter 100 is in steady state (e.g., having identical repetitive cycles), the damping capacitor 140 may have no effect on the ramp capacitor 135 as the damping capacitor 140 is charged to the voltage level of the ramp capacitor 135 in the prior cycle, which is identical to the current voltage level. However, when the control system is affected by an abrupt load change, the charge cycle ends with a ramp voltage level that is more or less (e.g. a load step down or a load step up) than the prior cycle. This effect results in sub-harmonic oscillations for D >50% for systems with no slope correction. However, the damping capacitor 140 may take the place of slope correction by providing inertia to the system. This may occur because the damping capacitor 140 is charged to the voltage level of the ramp capacitor 135 from the prior cycle. Therefore, the system resists the alternating duty cycle changes (e.g. long duty cycle to short duty cycle to long duty cycle) by rate limiting polarity reversals of the duty cycle.

Figure 2:
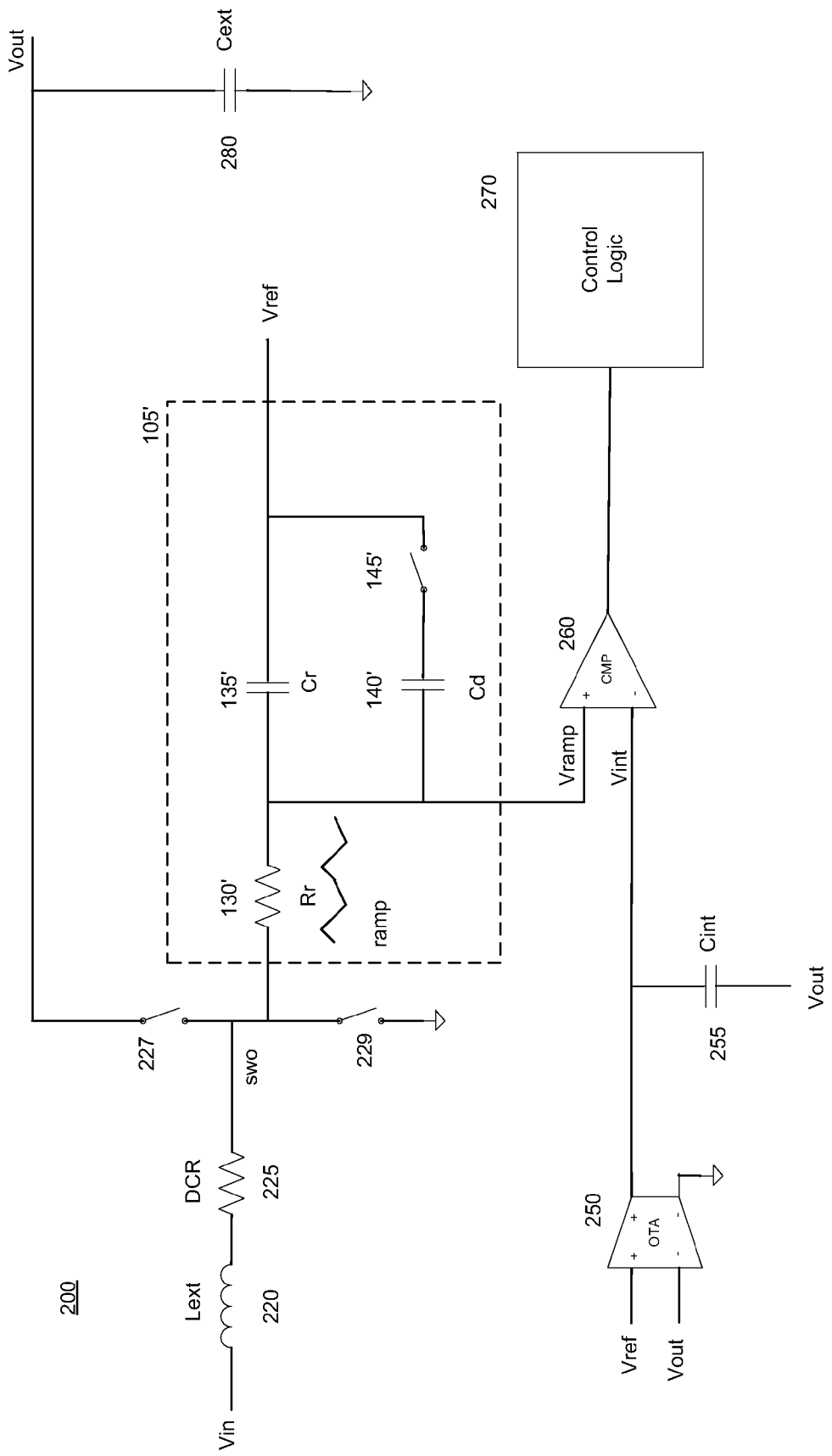
FIG. 2 illustrates a boost converter including ramp circuitry according to some example embodiments.

FIG. 2 illustrates a boost converter 200 including ramp circuitry 105' according to some example embodiments. The ramp circuitry 105' may include a ramp resistor 130' and a ramp capacitor 135' in series. The ramp circuitry 105' may also include a damping capacitor 140' and a damping switch 145' in series, which combined are in parallel to the ramp capacitor 135'. The ramp resistor 130' and the ramp capacitor 135' may generate a ramp waveform, an amplitude of the ramp waveform based on the RC time constant of the ramp circuitry 105'. In addition, the damping switch 145' may turn on or conduct at the beginning of each control cycle so that the ramp circuitry 105' may take into account a prior cycle.

The boost converter 200 is configured to receive an input voltage Vin and to generate an output voltage Vout that is greater than the input voltage Vin. For example, the boost converter 200 may control a high switch 227 and a low switch 229 to alternate between two different states. The first state occurs when the high switch 227 is conducting and the low switch 229 is not conducting, so that the input voltage Vin is coupled to the output voltage Vout through an inductor 220, which includes a DC resistance (DCR) 225. The second state occurs when the high switch 227 is not conducting and the low switch 229 is conducting, so that the output voltage Vout is only coupled to an external capacitor 280 and the input voltage Vin is coupled to a low reference potential (e.g., ground) through the inductor 220 and the DCR 225. During the first state, the output voltage Vout is based on the sum of the input voltage Vin and a voltage across the inductor 220, as the inductor is discharging energy towards the external capacitor 280. During the second state, the output voltage Vout is based only on a voltage across the external capacitor 280 and the input voltage Vin is storing energy in the inductor 220. In contrast to the buck converter 100 illustrated in FIG. 1, the boost converter 200 bases the duty cycle off of the low switch 229 conducting in the second state. Thus, a percent of time spent in the second state compared to the total time spent in the first state and the second state is considered the duty cycle of the boost converter 200. Decreasing the duty cycle decreases the output voltage Vout and increasing the duty cycle increases the output voltage Vout.

When the boost converter 200 is in the second state, the input voltage Vin may increase energy stored in the inductor 220. For example, the inductor 220 may have a positive voltage viewed left to right equal to a difference between the input voltage Vin and the low reference potential. When the boost converter 200 is in the first state, the inductor 220 may discharge at least some of the stored energy and may have a negative voltage viewed left to right, such that the output voltage Vout sees the inductor voltage added to the input voltage Vin. The external capacitor 280 coupled to the output voltage Vout may store energy in the first state and discharge the stored energy in the second state.

To regulate the output voltage Vout, the boost converter 200 may use an operational transconductance amplifier (OTA) 250, an integrator capacitor 255, a comparator 260 and control logic 270 to control the duty cycle of the boost converter 200. For example, the comparator 260 may compare a ramp voltage Vramp from the ramp circuitry 105' to an integrator voltage Vint. If the integrator voltage Vint is higher than the ramp voltage Vramp, the comparator 260 may output a logic low signal to the control logic 270 and the control logic 270 may control the boost converter 200 to be in the second state. If the ramp voltage Vramp is higher than the integrator voltage Vint, the comparator 260 may output a logic high signal to the control logic 270 and the control logic 270 may control the boost converter 200 to be in the first state. Thus, by comparing the ramp voltage Vramp to the integrator voltage Vint, the comparator 260 and the control logic 270 may control the duty cycle of the boost converter 200. This duty cycle can be expressed as a variable between 0 and 1, with a 0 indicating that the input voltage Vin is coupled to the output voltage Vout for the entire period and a 1 indicating that the input voltage Vin is coupled to the low reference potential for the entire period. The comparator 260 and the control logic 270 may be collectively referred to as a pulse wide modulated (PWM) stage of the boost converter 200.

In contrast to the buck converter 100 illustrated in FIG. 1, the ramp voltage Vramp of the boost converter 200 may include the reference voltage Vref and the ramp waveform generated by the ramp circuitry 105'. Because the inductor charging current produces a negative ramp slope on the ramp waveform, the boost converter 200 reverses the termination nodes of the ramp capacitor 135' and the integrator capacitor 255. The ramp waveform may be generated by filtering the free-wheeling side (SWO) of the inductor 220 using the ramp resistor 130' and the ramp capacitor 135'. As discussed above, the amplitude of the ramp waveform may be based on the RC time constant of the ramp resistor 130' and the ramp capacitor 135'.

A slope of the ramp waveform and a current through the inductor 220 may be dependent on a voltage across the inductor 220. For example, if the input voltage Vin is lower than the output voltage Vout, the slope may be calculated as the input voltage Vin minus the output voltage Vout, over the inductance of the inductor 220 [(Vin−Vout)/L].

As discussed above, the inductor 220 may have a negative voltage (Vin−Vout) in the first state of the boost converter 200 and a positive voltage (Vin) in the second state of the boost converter 200, and the voltage across the inductor 220 may switch instantaneously. Thus, the slope may be negative when the boost converter 200 is in the first state and positive when the boost converter 200 is in the second state. However, when the voltage across the inductor 220 reverses, the current through the inductor 220 remains the same. Therefore, a transition from the second state to the first state is a local maximum in the inductor current and the negative slope during the first state of the boost converter 200 decreases the inductor current to a local minimum prior to transitioning to the second state, where the positive slope during the second state of the boost converter 200 increases the inductor current to another local maximum. Similarly, a transition from the second state to the first state is a local maximum in a voltage across the ramp capacitor 135' and the negative slope during the first state of the boost converter 200 decreases the voltage across the ramp capacitor 135' to a local minimum prior to transitioning to the second state, where the positive slope during the second state of the boost converter 200 increases the voltage across the ramp capacitor 135' to another local maximum. This alternating negative and positive slope creates the ramp waveform, with the amplitude being the difference between the local maximum and the local minimum.

A shape of the ramp waveform is dependent on the duty cycle of boost converter 200, which may be based on 1 minus a ratio of the input voltage Vin to the output voltage Vout [D=1−Vin/Vout]. For example, if the input voltage Vin is roughly two thirds the output voltage Vout, the duty cycle will be roughly ⅓. As a result, the inductor 220 will have a negative voltage of ⅓ the output voltage Vout (or ½ the input voltage Vin) in the first state and a positive voltage of ⅔ the output voltage Vout (or ¼ the input voltage Vin) in the second state. Thus, the positive slope of the inductor current in the second state will be twice the negative slope of the inductor current in the first state, creating an asymmetric triangle wave.

The integrator voltage Vint for the boost converter 200 may include the output voltage Vout and a voltage across the integrator capacitor 255. Similar to the integrator capacitor 155 discussed above with regard to FIG. 1, the voltage across the integrator capacitor 255 may be based on the output of the OTA 250, which generates a current based on a comparison between the reference voltage Vref and the output voltage Vout. For example, the OTA 250 may generate a current as a linear function of the differential input voltage to the OTA 250, such that the current is equal to (Vref−Vout)*$g_m$. The coefficient $g_m$ may vary, but an example of a possible value is 5 μA/V. Thus, if the output voltage Vout is below the reference voltage Vref, a positive current is output to the integrator capacitor 255. If the output voltage Vout is above the reference voltage Vref, a negative current is output to the integrator capacitor 255.

Therefore, when the comparator 260 is comparing the ramp voltage Vramp to the integrator voltage Vint, the comparator 260 may be effectively comparing the reference voltage Vref and the ramp waveform to the output voltage Vout and the voltage across the integrator capacitor 255. If the reference voltage Vref and the ramp waveform is less than the output voltage Vout and the voltage across the integrator capacitor 255, the comparator 260 may output a logic low signal to the control logic 270 and the control logic 270 may control the boost converter 200 to be in the second state. If the reference voltage Vref and the ramp waveform is greater than the output voltage Vout and the voltage across the integrator capacitor 255, the comparator 260 may output a logic high signal to the control logic 270 and the control logic 270 may control the boost converter 200 to be in the first state. Therefore, the transition where the reference voltage Vref and the ramp waveform are equal to the output voltage Vout and the voltage across the integrator capacitor 255 determines the duty cycle.

As the reference voltage and the ramp waveform are intended to remain constant and consistent, respectively, and the duty cycle is determined by an intersection point of the reference voltage Vref and the ramp waveform with the output voltage Vout and the voltage across the integrator capacitor 255, the duty cycle is effectively controlled by the output voltage Vout and the voltage across the integrator capacitor 255. For example, if the output voltage Vout is less than the reference voltage Vref, the OTA 250 may increase the voltage across the integrator capacitor 255 to increase the intersection point and therefore increase the duty cycle. This increased voltage across the integrator capacitor 255 remains until the output voltage Vout is greater than the reference voltage Vref, at which point the OTA 250 may decrease the voltage across the integrator capacitor 255 to decrease the intersection point and therefore decrease the duty cycle.

The ramp circuitry 105' may allow fast load transient response between the boost converter 200 output and the PWM stage. As a result, a derivative of the output voltage Vout may experience only a high speed comparator delay. Moreover, voltage regulation may be performed without requiring an error amplifier or a compensation network, which further enhances load transient response.

A voltage across the DCR 225 may provide a load current dependent envelope term (−Iout*DCR, where Iout is the output current), which provides feedback for intrinsic mode control. However, the load current envelope term may also be filtered by the ramp circuitry 105', which makes it more difficult to balance setting the desired ramp amplitude without adding too much phase delay on the envelope term.

The damping capacitor 140' may add slope correction to the ramp circuitry 105'. As the damping switch 145' is turned on once a control cycle, the damping capacitor 140' may be sampled each control cycle to provide a voltage from the prior cycle. This may oppose duty cycle reverses and damp sub-harmonic oscillations.

Figure 3:
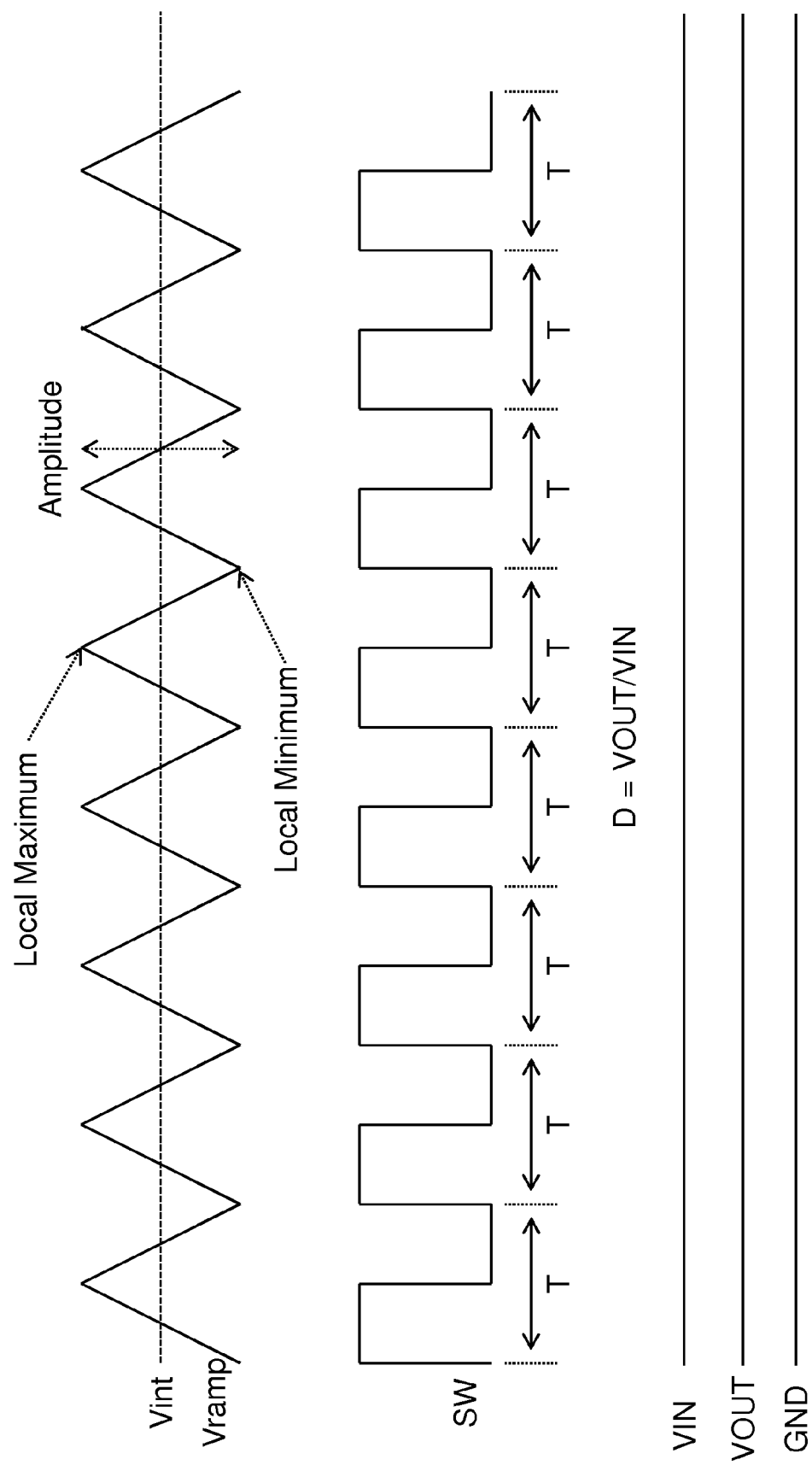
FIG. 3 illustrates ideal voltage waveforms according to some example embodiments.

FIG. 3 illustrates ideal waveforms for the example embodiments of FIG. 1 and/or FIG. 2. The waveforms illustrated in FIG. 3 have a duty cycle of approximately 50% (D=0.5) and are consistent and do not vary, which is ideal but not realistic. In practice, the integrator voltage Vint will vary in order to increase or decrease the output voltage Vout relative to the reference voltage Vref. For example, as discussed above, if the output voltage Vout is lower than the reference voltage Vref, the integrator voltage Vint will increase, increasing the duty cycle and therefore the output voltage Vout, until the output voltage Vout is equal to the reference voltage Vref. Similarly, if the output voltage Vout is higher than the reference voltage Vref, the integrator voltage Vint will decrease, decreasing the duty cycle and therefore the output voltage Vout, until the output voltage Vout is equal to the reference voltage Vref. In addition, the output voltage Vout may be included in the ramp voltage Vramp in the buck converter 100 or included in the integrator voltage Vint in the boost converter 200, which may cause a change in a slope of the ramp voltage Vramp or the integrator voltage Vint.

Some example embodiments may include a buck-boost converter configured so that the ramp circuitry 105 is used for both buck mode and boost mode. For example, switching circuitry may be configured to couple the output voltage Vout to the ramp circuitry 105 and the reference voltage Vref to the integrator capacitor in buck mode and configured to couple the reference voltage Vref to the ramp circuitry 105 and the output voltage Vout to the integrator capacitor in boost mode, as discussed below with regard to FIG. 5.

In a buck converter or buck mode of a buck-boost converter, the ramp circuitry 105 provides feedback from the output voltage Vout to the input of the comparator, while feed-forward is provided by the integrator capacitor. However, in a boost converter or boost mode of a buck-boost converter, the ramp circuitry 105 provides feed-forward from the reference voltage Vref instead of feedback. Therefore, feedback is provided by the integrator capacitor to the comparator. Collectively, in either buck mode or boost mode, feedback is provided to the control logic through the comparator, as feedback is provided from the output voltage Vout to either the positive terminal (Vramp) or the negative terminal (Vint) of the comparator.

The buck-boost converter may add a fixed pulse to each switching cycle, resulting in a tri-state control architecture. The additional state may be a flyback charge state in buck mode, and a flyback transfer state in boost mode. The fixed pulse may be scaled as a function of the output voltage Vout and the input voltage Vin such that a target active control state pulse width is obtained.

In addition, some example embodiments may include a multi-phase buck converter, a multi-phase boost converter or a multi-phase buck-boost converter. For example, the multi-phase buck converter could include additional ramp circuitry coupled to a single comparator and integrator capacitor, such that the comparator compares each of a first ramp voltage Vramp1, a second ramp voltage Vramp2 and any additional ramp voltages to the integrator voltage Vint at different times.

Figure 4:
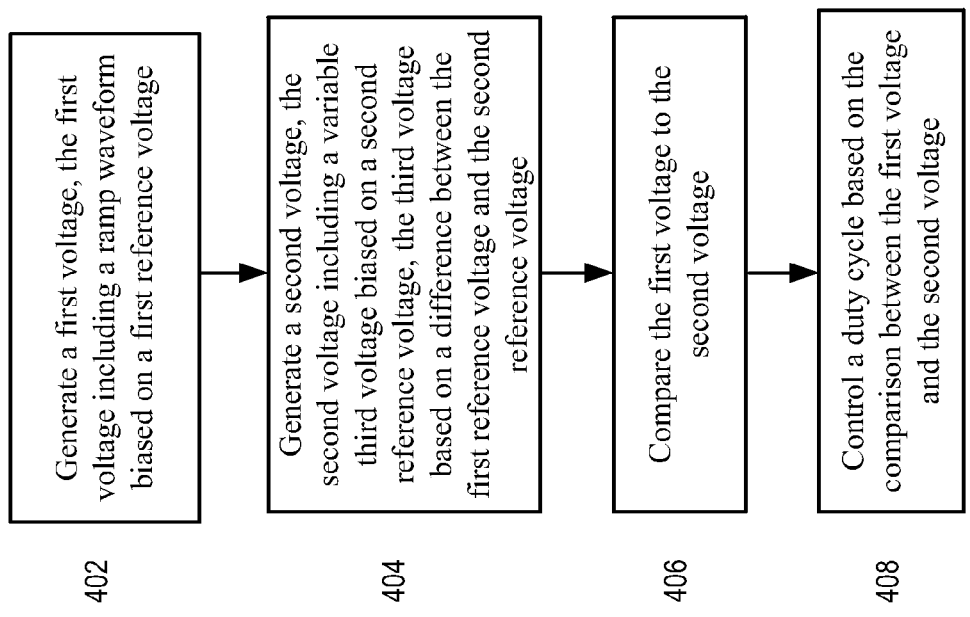
FIG. 4 is a flowchart of operations according to some example embodiments.

FIG. 4 is a flowchart of operations consistent with some example embodiments. In operation 402, a first voltage may be generated, the first voltage including a ramp waveform biased on a first reference voltage. In operation 404, a second voltage may be generated, the second voltage including a variable third voltage biased on a second reference voltage, the third voltage based on a difference between the first reference voltage and the second reference voltage. In operation 406, the first voltage may be compared to the second voltage. In operation 408, a duty cycle may be controlled based on the comparison between the first voltage and the second voltage. The first voltage may be generated by a resistor and a capacitor coupled in series between an inductor and the first reference voltage. In at least one embodiment, the first reference voltage may be an output voltage of a buck converter and the second reference voltage may be a desired or target voltage for the buck converter. In another embodiment, the first reference voltage may be a desired or target voltage for a boost converter and the second reference voltage is an output voltage of the boost converter.

Figure 5:
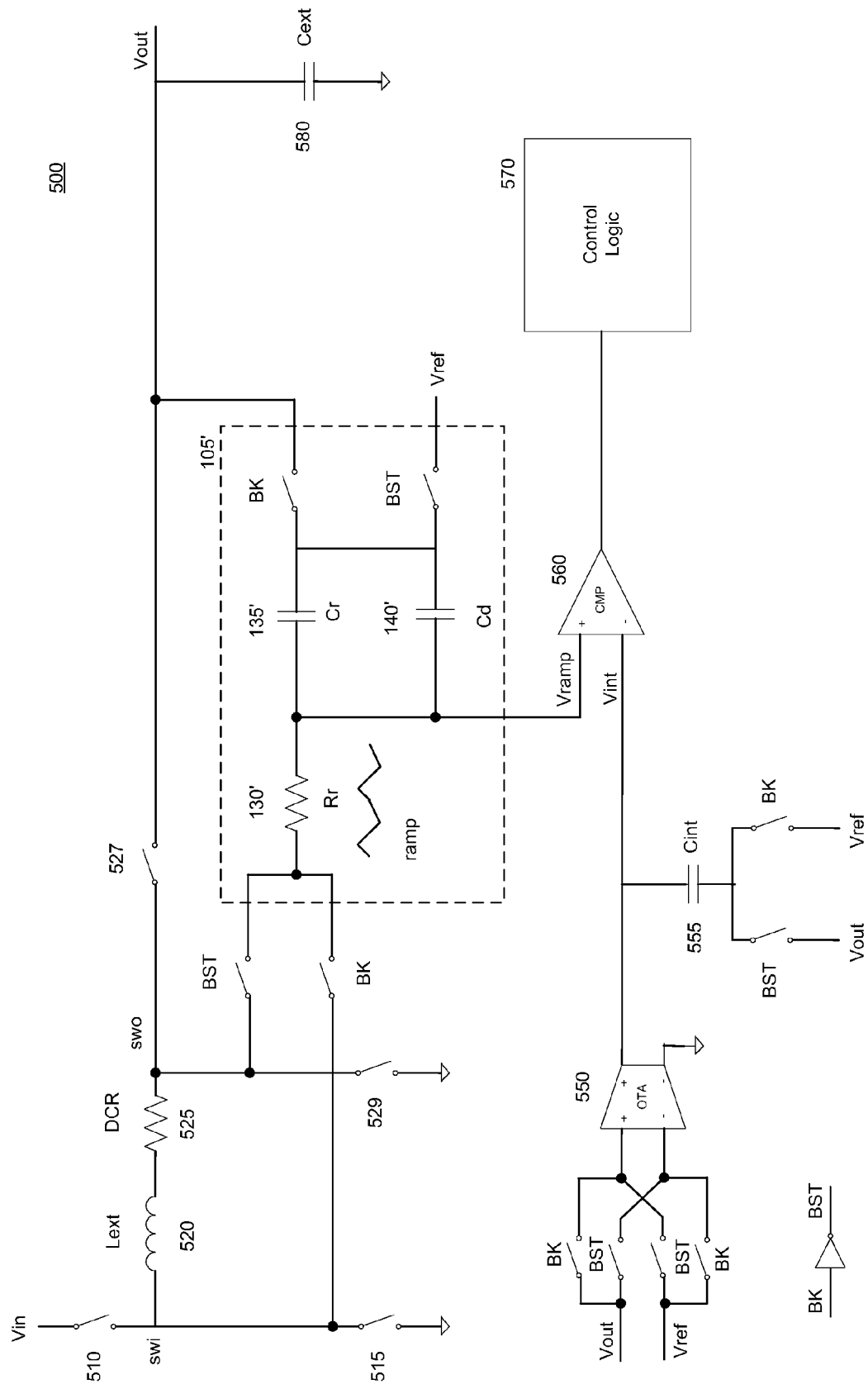
FIG. 5 illustrates a buck-boost converter including ramp circuitry according to some example embodiments.

FIG. 5 illustrates a buck-boost converter 500 including ramp circuitry 105' according to some example embodiments. The ramp circuitry 105' may include a ramp resistor 130' and a ramp capacitor 135' in series. The ramp circuitry 105' may also include a damping capacitor 140' in parallel to the ramp capacitor 135'. The ramp circuitry 105 may operate as discussed above with regard to FIG. 1 or 2, depending on the state of the buck-boost converter 500.

The buck-boost converter 500 may include elements similar to the buck converter 100 illustrated in FIG. 1 and/or the boost converter 200 illustrated in FIG. 2. For example, high switch 510 and low switch 515 are similar to high switch 110 and low switch 115 of the buck converter illustrated in FIG. 1, while high switch 527 and low switch 529 are similar to high switch 227 and low switch 229 illustrated in FIG. 2. Likewise, an inductor 520, with included DC resistance (DCR) 525, operational transconductance amplifier (OTA) 550, integrator capacitor 555, comparator 560, control logic 570 and external capacitor 580 may be similar to the elements discussed above with regard to FIGS. 1-2.

In addition to the elements discussed above with regard to FIGS. 1-2, the buck-boost converter 500 may include switches that are controlled by a buck signal (BK) and a boost signal (BST). During buck mode, the buck signal (BK) is high and the boost signal (BST) is low, coupling the ramp circuitry 105', the OTA 550 and the integrator capacitor 555 in the buck configuration. During boost mode, the boost signal (BST) is high and the buck signal (BK) is low, coupling the ramp circuitry 105', the OTA 550 and the integrator capacitor 555 in the boost configuration.

For example, in the buck mode, the buck signal (BK) couples the ramp resistor 130' to the free-wheeling side (SWI) of the inductor 520 between the high switch 510 and the low switch 515. Similarly, the buck signal (BK) couples the ramp capacitor 135' to the output voltage Vout and the integrator capacitor 555 to the reference voltage Vref. Finally, the buck signal (BK) couples the positive terminal of the OTA 550 to the output voltage Vout and the negative terminal of the OTA 550 to the reference voltage Vref.

However, in boost mode the switches are reversed, and the boost signal (BST) couples the ramp resistor 130' to the free-wheeling side (swo) of the inductor 520 between the high switch 527 and the low switch 529. Similarly, the boost signal (BST) couples the ramp capacitor 135' to the reference voltage Vref and the integrator capacitor 555 to the output voltage Vout. Finally, the boost signal (BST) couples the positive terminal of the OTA 550 to the reference voltage Vref and the negative terminal of the OTA 550 to the output voltage Vout.

While in buck mode, the elements operate as discussed above with regard to the buck converter 100 illustrated in FIG. 1. In boost mode, the elements operate as discussed above with regard to the boost converter 200 illustrated in FIG. 2. In addition, the buck-boost converter 500 may add a fixed pulse to each switching cycle, resulting in a tri-state control architecture. The additional state may be a flyback charge state in buck mode, and a flyback transfer state in boost mode. The fixed pulse may be scaled as a function of the output voltage Vout and the input voltage Vin such that a target active control state pulse width is obtained.

In buck mode, the ramp circuitry 105' provides feedback from the output voltage Vout to the input of the comparator 560, while feed-forward is provided by the integrator capacitor 555. However, in boost mode, the ramp circuitry 105' provides feed-forward from the reference voltage Vref instead of feedback. Therefore, feedback is provided by the integrator capacitor 555 to the comparator 560. Collectively, in either buck mode or boost mode, feedback is provided to the control logic 570 through the comparator 560, as feedback is provided from the output voltage Vout to either the positive terminal (Vramp) or the negative terminal (Vint) of the comparator 560.

Note that numerous variations on the topology illustrated herein could be made while not departing from the core concept of the invention. For example, the ramp circuitry could be used in any buck converter, boost converter, buck-boost converter or other DC-DC power converters. Similarly, the ramp circuitry could be used in multiphase circuits having a single integrator voltage Vint and multiple ramp voltages Vramp and corresponding circuitry. In at least one example multiphase implementation, second and third comparators 160 may be configured to receive a Vint signal and multiple Vramp signals (e.g., three or more) in a manner similar to that illustrated in FIG. 1 for the single comparator 160 implementation. For example, there may be one Vint signal generated by Cint and three or more Vramp signals each generated by separate RC circuits made up of different sets of Rr 130 and Cr 135 corresponding to switch nodes for each phase. Each Vramp signal may be routed to each of the first, second and third comparators 160. The output of each comparator may control the switch state for each phase. For example, a phase 1 comparator 160 may receive a Vramp1 signal generated by a phase 1 RC circuit and may compare the Vramp1 signal to Vint. The output of the phase 1 comparator 160 may then control the state of a phase 1 switch. This may be repeated for each phase. In an alternative multiphase implementation, the multiple Vramp signals may be routed via a multiplexer configured to receive each of the Vramp signals generated by each of the RC circuits, and to then direct each of the Vramp signals to a single comparator 160 (e.g., in a sequential manner). The general topology of the system also need not be restricted to using a fixed frequency clock, but could use a variable clock or hysteretic control.

"Circuitry", as used in any embodiment herein, may comprise, for example, singly or in any combination, hard-wired circuitry, programmable circuitry, state machine circuitry, and/or firmware that stores instructions executed by programmable circuitry.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The invention claimed is:

1. Feedback circuitry for a power converter, the feedback circuitry comprising:
   a first resistor coupled to a first node between a high switch and a low switch;
   a first capacitor in series with the first resistor, the first capacitor coupled to a second node;
   a first comparator having a positive terminal connected between the first resistor and the first capacitor and a negative terminal connected to a third node, the first comparator configured to compare a voltage at the positive terminal to a voltage at the negative terminal, wherein the feedback circuitry is configured to generate a ramp waveform having an amplitude based on a time constant of the first resistor and the first capacitor and provide the ramp waveform to the positive terminal of the first comparator; and
   a second capacitor in parallel with the first capacitor; and
   a switch in series with the second capacitor, the switch configured to close once per clock cycle.

2. The feedback circuitry of claim 1, wherein the second capacitor is configured to reduce subharmonic oscillations.

3. The feedback circuitry of claim 1, further comprising:
   a second capacitor coupled to the third node; and
   an operational transconductance amplifier configured to output a current to the second capacitor based on a difference between a reference voltage and an output voltage.

4. The feedback circuitry of claim 1, wherein the power converter is a buck converter, the voltage at the positive terminal is based on, at least in part, the output voltage and the ramp waveform, and the voltage at the negative terminal is based on, at least in part, the reference voltage.

5. The feedback circuitry of claim 1, wherein the power converter is a boost converter, the voltage at the positive terminal is based on, at least in part, the reference voltage and the ramp waveform, and the voltage at the negative terminal is based on, at least in part, the output voltage.

6. The feedback circuitry of claim 1, further comprising:
   a second comparator having a negative terminal connected to the third node, the second comparator configured to compare a voltage at the positive terminal to a voltage at the negative terminal; and
   a third comparator having a negative terminal connected to the third node, the third comparator configured to compare a voltage at the positive terminal to a voltage at the negative terminal.

7. The feedback circuitry of claim 1, further comprising:
   a multiplexer, a first input of the multiplexer coupled between the first resistor and the first capacitor, at least a second input of the multiplexer coupled between at least a second resistor and a second capacitor, an output of the multiplexer coupled to the positive terminal of the first comparator.

8. The feedback circuitry of claim 3, wherein the voltage at the negative terminal is a sum of a voltage of the second capacitor and the reference voltage or the output voltage; and
   the voltage at the positive terminal is a sum of the ramp waveform and the other of the reference voltage and the output voltage.

9. A method for power conversion, the method comprising:
   generating a first voltage based on a ramp waveform biased by a first reference voltage;
   generating a second voltage based on a variable third voltage biased by a second reference voltage, wherein the third voltage is based on a difference between the first reference voltage and the second reference voltage;
   comparing the first voltage to the second voltage; and
   controlling a duty cycle based on the comparison between the first voltage and the second voltage.

10. The method of claim 9, wherein
    the first reference voltage is an output voltage of a buck converter, and
    the second reference voltage is a desired voltage for the buck converter.

11. The method of claim 9, wherein
    the first reference voltage is a desired voltage for a boost converter, and
    the second reference voltage is an output voltage of the boost converter.

12. The method of claim 9, wherein the first voltage is generated by a resistor and a capacitor coupled in series between an inductor and the first reference voltage.

* * * * *